Nov. 24, 1959     C. J. HOLTKAMP     2,914,644
OVEN CONTROL APPARATUS
Filed Oct. 11, 1957     3 Sheets-Sheet 1
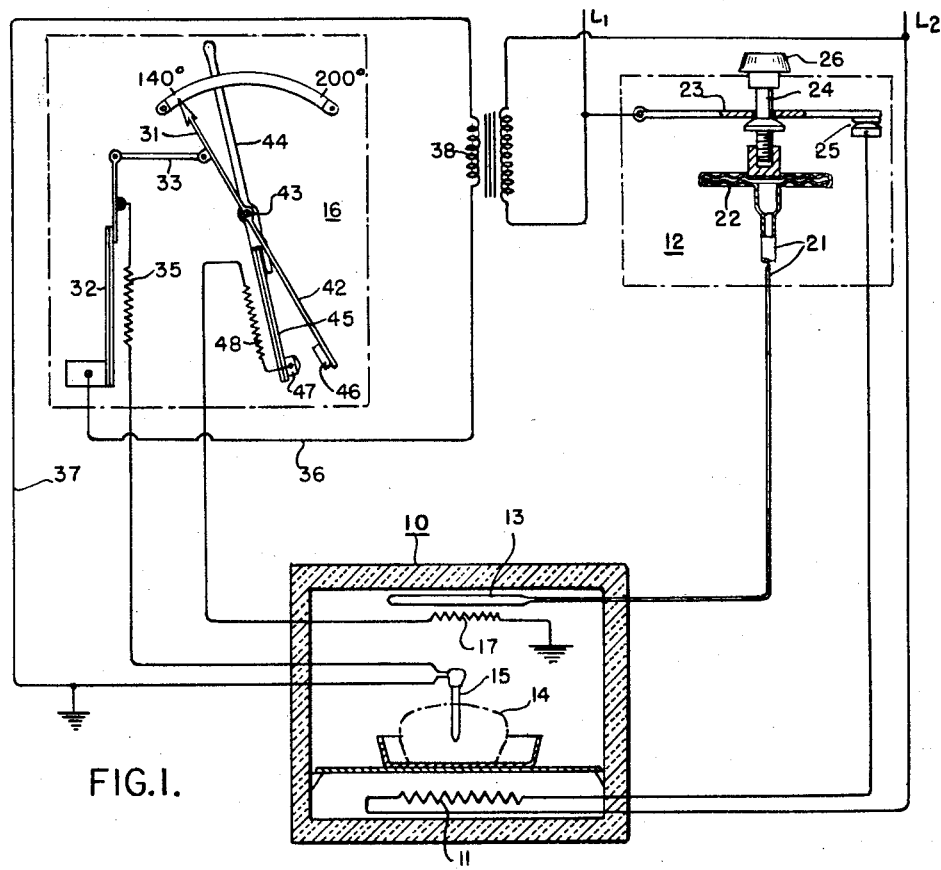
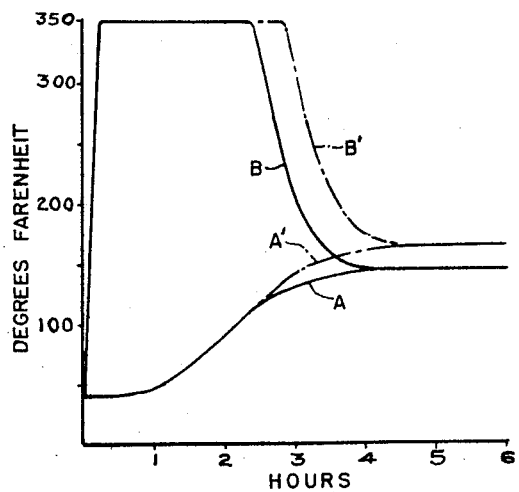
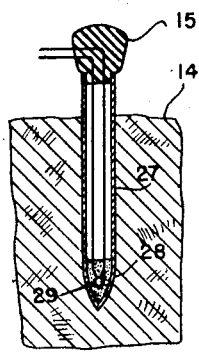
INVENTOR
CALVIN J. HOLTKAMP
BY M.C. Frendenberg
ATTORNEY Nov. 24, 1959  C. J. HOLTKAMP  2,914,644
OVEN CONTROL APPARATUS
Filed Oct. 11, 1957  3 Sheets-Sheet 2

INVENTOR
CALVIN J. HOLTKAMP
BY M. C. Freudenberg
ATTORNEY

Nov. 24, 1959 C. J. HOLTKAMP 2,914,644
OVEN CONTROL APPARATUS
Filed Oct. 11, 1957 3 Sheets-Sheet 3

INVENTOR
CALVIN J. HOLTKAMP
BY M. C. Freudenberg
ATTORNEY

United States Patent Office 2,914,644
Patented Nov. 24, 1959

2,914,644

OVEN CONTROL APPARATUS

Calvin J. Holtkamp, Mansfield, Ohio, assignor to Westinghouse Electric Corporation, East Pittsburgh, Pa., a corporation of Pennsylvania Application October 11, 1957, Serial No. 689,627

15 Claims. (Cl. 219—20)

This invention relates to cooking apparatus, and more particularly to a control for an oven. This application is a continuation-in-part of my application Serial No. 605,511, originally filed August 22, 1956.

An object of the invention is to provide a control that is adapted to control the operation of an oven when cooking a comestible, such as a meat roast, so as to provide the desired degree of doneness thereof whether rare, medium or well done.

Another object is to provide an oven control that controls the heating means to provide the amount of heat required to cook the roast to the desired degree of doneness, and then to supply the amount of heat necessary to keep the roast hot at the desired temperature, so that it is not necessary to remove the roast at any particular time to avoid overcooking.

Heretofore, in cooking a roast, the desired degree of doneness has been obtained principally by controlling the period of cooking, the period being terminated earlier the more rare the meat is desired. Temperature indicating devices to indicate the temperature of the center of the roast have been provided to aid in determining the time when the cooking operation should be terminated. It is necessary to closely watch the cooking operation, as the roast must be promptly removed at the correct time to avoid overcooking.

In accordance with the present invention, there is provided control apparatus which first provides a cooking temperature well above the final desired temperature of the roast, which cooking temperature is preferably similar to that heretofore used. However, the control further includes mechanism responsive to the temperature of the interior of the roast and which lowers the oven temperature, preferably gradually through a series of progressively lower temperatures, as the temperature of the roast increases through a series of progressively higher internal temperatures. The oven temperature is reduced to the value providing the desired degree of doneness of the roast and thereafter keeps the roast warm at the desired temperature with little, if any, change in the degree of doneness.

The foregoing and other objects are effected by the invention as will be apparent from the following description and claims taken in connection with the accompanying drawings, forming a part of this application, in which:

Fig. 1 is a diagrammatic illustration of an oven control system for roasting meats, including a probe for sensing the internal temperature of the meat;

Fig. 2 is an enlarged section of the meat probe of Fig. 1 shown extending into a meat roast;

Fig. 3 is a graph illustrating certain time and temperature relationships for meat roasting operations;

Figure 4:
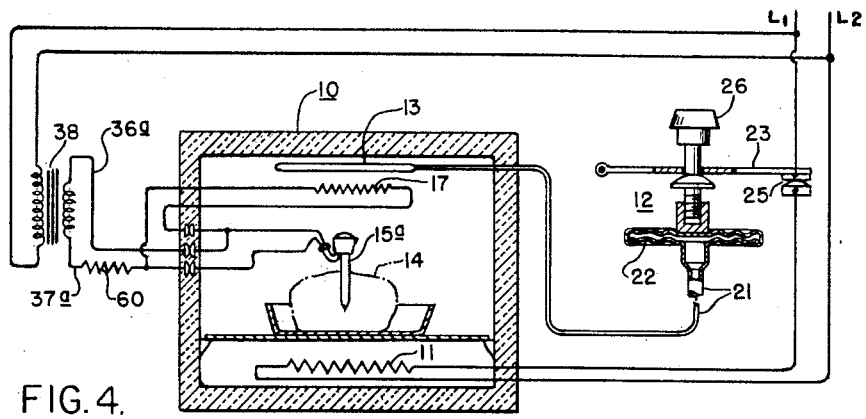
Fig. 4 is a diagrammatic illustration of an oven control system for roasting meats showing a second embodiment of this invention.

Referring to the drawings in detail, a cooking oven, indicated diagrammatically at 10, is provided with a conventional oven heater, in this case, an electric heater 11. The heater 11 is controlled by a conventional hydraulic oven thermostat device 12 having a thermally responsive element in the form of a liquid-filled control bulb 13 located within the oven. However, it will be apparent that the conventional oven heater may be a gas burner, in which case the conventional oven thermostat will adjust a valve controlling the supply of gas to the burner. A roast of meat 14 is disposed within the oven and a temperature sensing probe 15 is inserted into the roast with its tip end within the central portion of the roast. A control 16 for modifying the action of the oven thermostat in response to the temperature of the meat is located remote from the probe 15 outside the oven except for an auxiliary heating element 17, which is disposed adjacent the control bulb 13. The probe 15, control 16 and auxiliary heating element 17 constitute oven temperature reducing means.

Referring to the oven thermostat 12, the bulb 13 is connected by a tube 21 to a diastat 22, which is adapted upon expansion to actuate an electrically conducting contact lever 23 through an adjustable screw 24, thus opening the contacts of a switch 25. The bulb 13, the tube 21 and the diastat 22 are completely filled with a suitable liquid, such as chlorinated diphenol. Upon increase in temperature in the oven, the liquid in the bulb 13 expands, whereupon the diastat 22 moves the lever 23 in contact opening direction. Upon decrease in oven temperature, the liquid contracts, whereupon the diastat 22 permits the lever 23 to move in contact closing direction. The temperature setting or control temperature of the thermostat, that is, the temperature of the bulb 13 at which the contacts of switch 25 are opened and closed and at which the oven is thus maintained, may be manually adjusted by turning the screw 24 by means of a knob 26. By turning this screw 24 to lengthen the connection between the diastat 22 and the lever 23, the temperature setting is lowered, while turning it to shorten the connection raises the temperature setting.

The oven thermostat 12 may be identical in all respects to any known hydraulic thermostat, such as one of those already on the market. Such a thermostat usually closes its contacts at a temperature somewhat below the temperature at which it opens its contacts, thereby maintaining the oven temperature within a limited range of values, the medium of which may be considered as the control temperature.

The probe 15, as seen in Fig. 2, constitutes a temperature responsive instrument, and comprises an elongated or tubular casing 27 having a closed pointed end 28 adapting the probe for insertion into a meat roast. By tubular casing or element is meant, in this case, an elongated casing regardless of the shape of its cross section. Positioned within the pointed closed end of the casing 27 is a thermally responsive element in the form of a thermistor 29, that is, a resistor whose resistance varies with change in temperature, preferably one whose resistance decreases upon increase in temperature. The thermistor is a means for sensing an internal temperature of a body of meat or other food and is located, and insulated from, the casing 27 in any suitable manner, as by imbedding it in a suitable temperature resistant cement. The other end of the casing 27 is closed by a suitable insulating material, which may be a suitable silicone through which the leads to the thermistor 29 extend.

The control 16 includes a pivotally supported temperature indicating pointer or lever 31 which moves along a temperature indicating scale. The pointer 31 is actuated by a bimetal strip 32, to which it is connected through a link 33 and an extension element attached to the bimetal 32. The bimetal 32 is adapted to be heated by a resistance heating element 35 which is connected in series with the thermistor 29 in probe 15, the two in series being connected through the bimetal 32 and conductors 36 and 37 to the secondary of transformer 38 which provides a low voltage source of, for example, six volts. The conductor 37 is grounded. The primary of transformer 38 is connected to conductors $L_1$ and $L_2$ which supply power to the oven heater 11 from a conventional 115 volt power source.

The pointer 31 has an extension 42 on the opposite side of the pivot 43, and a lever 44, also pivoted coaxially of the pivot 43, is provided with an extension 45. The extensions 42 and 45 are provided with cooperating contacts 46 and 47, respectively.

An indicating device to indicate meat temperature as so far described has been heretofore known. The operation of the indicating device is as follows: As the meat temperature rises, the resistance offered by the resistor 29 to the flow of current therethrough decreases, permitting increased current to flow through the heating element 35. Increased heat is thus transmitted to the bimetal 32, causing it to deflect further to the right, moving the pointer 31 to the right, or clockwise in Fig. 1, to indicate a higher temperature. By setting the lever 44 to a desired temperature setting, the contacts 46 and 47 may be utilized to sound an alarm or possibly to terminate further energization of the main heating unit 11.

In accordance with the present invention, the signal provided by the temperature indicating device in response to the temperature of thermistor 29 is utilized to modify the action of the oven thermostat 12. A wattage control device controlled by the pointer 31 and the lever 44 controls the average wattage supplied to the heater 17. The heater 17 is of low wattage, such as 20 watts, and is arranged so that it is in good heat transfer relation to the bulb 13 without greatly affecting the exposure of the bulb to the oven temperature. To provide the wattage control device, the extension 45 of the lever 44 is made of thermally responsive bimetal electrically insulated therefrom and positioned to open the contacts 46 and 47 on increase in temperature, and there is provided a heating element 48 adapted to heat the bimetal 45 when the contacts are closed. The heating element 48 and the contacts 46 and 47 are connected in series with the heating element 17, the circuit extending from conductor 36 through bimetal 32, link 33, pointer 31, pointer extension 42, contacts 46 and 47, heating element 48 and heating element 17 through ground to conductor 37.

*Operation*

To initiate a cooking operation, the oven thermostat 12 is adjusted to a suitable cooking temperature, for example, 350° F., the same as with conventional roasting methods heretofore used. The lever 44 is adjusted to and suitably retained in a temperature position corresponding to the degree of doneness of the meat that is desired. For example, it is adjusted to a temperature of 145° F. to 150° F. for rare, and 175° F. to 180° F. for well done beef. The probe 15 is inserted into the roast with the temperature responsive element 29 positioned in the central portion of the roast.

In the initial portion of the cooking operation, the meat is at a low temperature, so that the resistance of the thermistor 29 is high, the current flow through the heating element 35 is low, and the bimetal 32 maintains the pointer 31 toward the left-hand or low temperature end of the scale, with the contacts 46 and 47 in spaced relation. Thus, the heating element 17 is deenergized and the oven thermostat 12 operates in the usual manner of a conventional oven thermostat to quickly bring the oven temperature up to and maintain it at a temperature suitable for cooking meat, for example, 350° F., during a first portion of the roasting operation, as indicated by the oven temperature curve B of Fig. 3. As the temperature of the meat increases along curve A of Fig. 3, the pointer 31 moves to the right, as explained above. As the meat approaches a temperature which is, for example, 30 degrees below the temperature to which the lever 44 is adjusted, the extension 42 moves its contact 46 into engagement with the contact 47. This closes the circuit through the heating elements 48 and 17, and the heat from the element 48 is transmitted to the bimetal 45, which is deflected in the direction to open the contacts 46 and 47. The element 48 is thereupon deenergized and permits the bimetal 45 to cool and move in the direction to close the contacts. Thus, there is begun a cycling operation of the contacts 46 and 47 providing a low wattage supply to the heating element 17.

The heat generated in the heating element 17 is conducted to the bulb 13 and increases the temperature of the liquid therein. The liquid expands and the oven thermostat 12 operates in the direction of contact opening or direction of decrease in the heat supply to the oven. The supply of heat from the heating element 17 to the bulb 13 has the effect of lowering the setting or control temperature of the thermostat 12 because, the more heat that is supplied by the heating element 17, the lower is the temperature of the interior of the oven to provide expansion of the liquid to provide actuation of the contacts. In other words, the effective control temperature of the thermostat 12 is reduced by heat from the heating element 17. The reduction in oven temperature is indicated by the oven temperature curve B of Fig. 3.

As the temperature of the meat increases further along curve A of Fig. 3, the pointer 31 is moved further to the right and greater deflection of the bimetal 45 is required to open the contacts 46 and 47. This means that greater periods of energization of the heating element 48 are required to provide the additional heat to open the contacts and shorter periods of deenergization are required to cool the bimetal for reclosure of the contacts. Thus, higher average wattage is supplied to the heating element 17 which, in turn, delivers more heat to the bulb 13 and lowers the effective control temperature. In this manner, the oven temperature is reduced through a series of progressively lower temperatures in response to the meat attaining a series of progressively higher internal temperatures. As the oven temperature decreases to approximately the temperature of the meat, an equilibrium point is reached, after which the meat temperature and the oven temperature remain substantially constant, as indicated in Fig. 3. This equilibrium point is the meat temperature that has been preselected by setting the lever 44 to give the desired degree of doneness of the roast. The contacts 46 and 47 continue to cycle to provide the proper degree of wattage to the element 17, which causes the thermostat 12 to operate at the proper temperature setting.

After a roasting operation has progressed to the point where the roast has reached the temperature indicating the desired degree of doneness, with the oven temperature reduced to and maintained at approximately this same doneness temperature, the meat may be left in the oven with little change, if any, in its condition of doneness. Thus, the meat may be removed even an hour or more later at the convenience of the user and it is not necessary to closely watch the oven to manually reduce the oven heat or to remove the meat at exactly the right time. This operation lends itself to automatic time control. It is merely necessary to allow enough time; it is not necessary to closely gauge the time to limit the degree of doneness.

Referring to Fig. 3, the curve A represents the variation in meat temperature, taken at the center of the roast, and the line B represents oven temperature. Due to the fact that the oven temperature decreases substantially during the latter part of the cooking operation, a somewhat greater length of time is required. An increase of two to five minutes per pound of meat has been found necessary in some roasting operations performed with this type of control. However, this is offset by the advantage of automatically controlling the degree or doneness of the meat. Also, there is less overcooking of the outer portion of the roast.

The degree of doneness is determined by the setting of the lever 44, because, the more that it is moved to the right or in clockwise direction, the higher must be the temperature of the roast to bring the contacts 46 and 47 into engagement to begin the wattage control for heating element 17 for reducing the oven temperature. Thus, the equilibrium point is increased.

Should it be desired to cook a roast in the minimum amount of time, even though it is necessary to closely watch the cooking operation to terminate it when the desired degree of doneness is attained, this can readily be done by moving the lever 44 to the extreme right-hand position, so that the operation of the thermostat 12 will not be affected by the control 16. The cooking operation may then be effected in the manner heretofore conventional.

The solid line curves A and B of Fig. 3 represent a roasting operation resulting in meat somewhat on the rare side. If the control is adjusted by moving lever 44 to the right, or clockwise, as described above, to provide meat that is more towards well done, the meat temperature and oven temperature may follow curves A' and B', respectively, which level out at a somewhat higher equilibrium temperature value.

*Second embodiment*

Figures 5, 6:
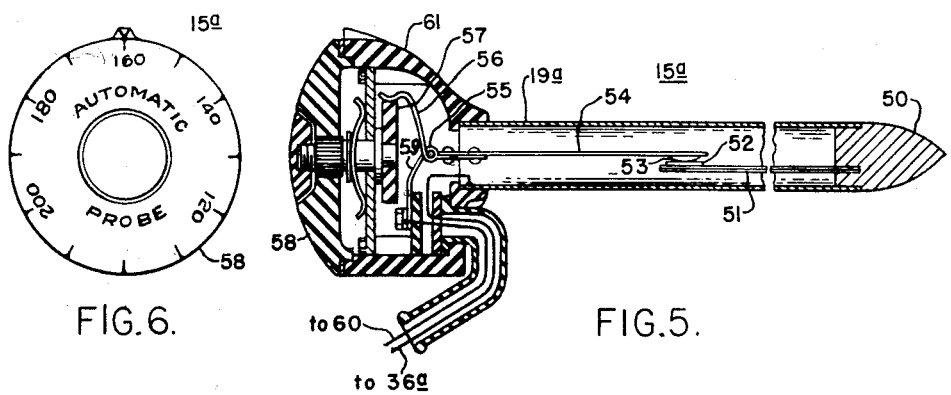
Fig. 5 is an enlarged section of a meat probe forming part of the system of Fig. 4.
Fig. 6 is an end view of the meat probe shown in Fig 5.

In the second embodiment of the invention shown in Figs. 4 through 6, the oven control system differs from the control of Figs. 1 and 2 only in the construction of the meat probe 15a and the circuit controlled thereby for energizing the heating element 17 adjacent the bulb 13 of the oven thermostat 12. Parts identical to those of Fig. 1 bear like reference numerals.

As seen in Fig. 5, the temperature responsive element within the probe 15a, which constitutes means for sensing an internal temperature of a body of meat or other food, is a bimetal strip 51, which is also part of a cycling wattage control switch. The bimetal 51 is attached at one end to the pointed closure member 50 of the probe. At its other end it carries a contact 52 which is adapted to cooperate with a contact 53 carried by a pivoted contact arm 54. The latter is pivoted at 55 in a casing 61 attached to the tubular casing 19a. The arm 54 has a rigid extension 56 that serves as a cam follower and is biased against the peripheral cam surface of a cam member 57 by means of a spring arm 59, which also serves as an electrical lead. The cam member 57 is mounted on a shaft on which a control knob 58 is also mounted for rotating the cam member 57.

In this embodiment, a supply of low voltage, such as six volts, is provided from the transformer 38 by conductors 36a and 37a, and the heating element 17 is connected in series with a current limiting resistor 60 across these two conductors. The circuit through the contacts 52 and 53 extends from the conductor 36a through the casing 19a, the closure member 50, the bimetal 51, the contacts 52 and 53, the arms 54 and 59, the resistor 60, to the conductor 37a. In this embodiment, the heating element 17 is adapted to be deenergized by the contacts 52 and 53 by closing a circuit that shunts the heating element 17.

In the cycling wattage control of this embodiment, the bimetal 51 is heated by the flow of current therethrough and caused to deflect in contact opening direction. As the contacts 52 and 53 open, the heating terminates, whereupon the bimetal cools and then flexes in contact closing direction. Thus, the contacts are cyclically opened and closed in the usual manner of such a cycling switch. During the time that the contacts are open, the heating element 17 is energized, and, when the contacts are closed, the current is shunted from the heating element 17 to the contacts and the heating element 17 is effectively deenergized or energized at a minimum level. The period that the contacts are closed during each cycle may be varied by means of the cam 57. The further that the arm 54 is moved toward the bimetal 51, the longer is the period of energization required to open the contacts and the longer is the percentage of each cycling period that the contacts remain closed.

In a roasting operation, as described above, upon increase in temperature of the meat, the bimetal 51 also responds to such increase in temperature and tends to flex in the direction tending to separate the contacts 52, 53. The more it flexes in that direction due to increase in meat temperature, the shorter is the period of contact engagement and the longer the period of contact opening. Thus, the period of energization and the average wattage of the heating element 17 increases, thereby lowering the control temperature of the thermostat 12.

The operation of the embodiment shown in Fig. 4 is generally similar to that described in connection with the system of Fig. 1. The cycling switch in the probe 15a will start to cycle as soon as the combined heating effects of the meat temperature and the current through the bimetal 51 is sufficient to cause the bimetal to separate the contacts 52 and 53. As the probe temperature rises, the percentage of open contact time increases as the contacts continue to cycle. The oven temperature will then be gradually reduced as the meat temperature rises and an equilibrium condition will ultimately be reached at which the oven temperature and roast temperature remain at approximately the same value. This value may be varied to adjust the degree of doneness of the roast by adjusting the control knob 58.

*Third embodiment*

Figure 7:
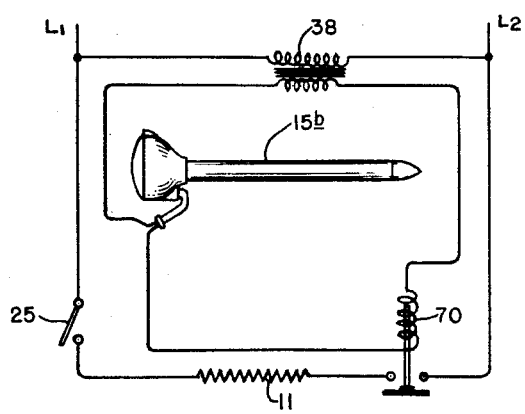
Fig. 7 shows a third embodiment of the oven control system of this invention.

Referring to the embodiment of this invention shown in Fig. 7, the control system is generally like that shown in the embodiments referred to above, the oven heater 11 and the switch 25 of the oven thermostat being identical. In the system of Fig. 7, however, a meat probe 15b, constructed like probe 15a of Fig. 5, is connected so that its contacts actuate a relay 70 connected in series with the oven heater 11 and the switch 25 of the oven thermostat. This system operates similarly to that of Fig. 4, but the probe 15b controls the oven heater 11 through the relay 70 rather than by supplying heat to the temperature sensing bulb of the oven thermostat 12. In this arrangement, the primary function of the oven thermostat is to limit the maximum temperature in the oven to prevent excessive searing and smoking while cooking the roast.

The meat probe in this arrangement operates the same as that in Fig. 4, with the percentage of closed contact time of its contacts gradually being reduced as the probe temperature rises with the rise in temperature at the center of the meat. The contacts of relay 70 will be opened for periods corresponding to the opening of the probe contacts, and thus the heat supplied by the oven heaters will be gradually decreased to a level determined by adjustment of the probe dial. The oven temperature and the probe temperature will ultimately reach an equilibrium condition, after which there is little change in either. The temperature level of this equilibrium condition may be adjusted by the probe dial to provide any desired degree of doneness of a meat roast from rare to well done. After the roast is done, the contacts in the probe 15b continue to cycle to alternately energize and deenergize the relay 70 to maintain the oven temperature at approximately the doneness temperature of the meat to provide little, if any, change in the doneness condition of the latter, even though the meat may not be removed from the oven for an hour or more.

*Fourth embodiment*

From the above description of the control of Fig. 1, it will be found that, for a given setting of the oven thermostat 12, the heater 17 must provide more heat to the oven thermostat bulb 13 to maintain the oven at the desired doneness temperature for a rare roasting operation than is required for a well done operation. Although it is desirable to have the pointer elements 31 and 44 in the control of Fig. 1 aligned when the condition of doneness is reached for all types of roasting operations, exact pointer alignment can be achieved only at one point on the scale. This occurs since the pointer elements 31 and 44 must have different relative positions at doneness to provide the percentage of closed time of contacts 46 and 47 for obtaining the necessary output of heater 17 dependent upon the doneness condition selected. The apparatus of Fig. 8, described hereinafter, is designed to assure pointer alignment when the roast is done during any of the selectable roasting operations from rare to well done.

Figure 8:
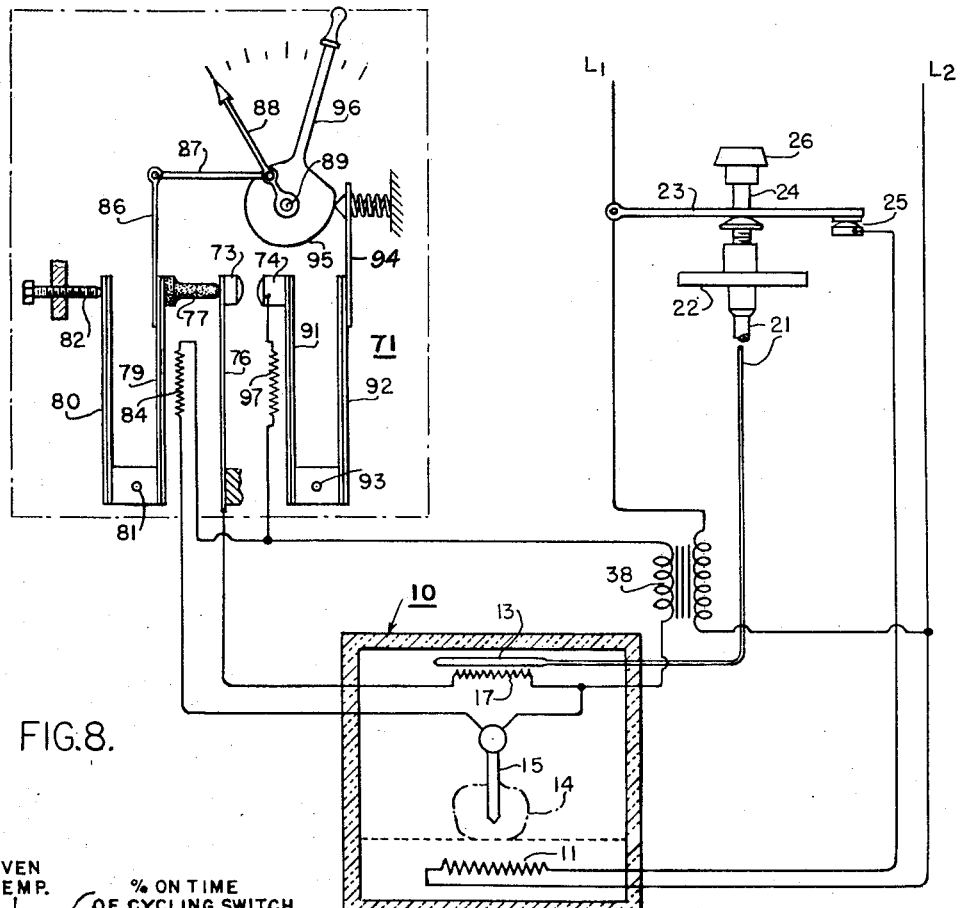
Fig. 8 is a diagrammatic illustration of a fourth embodiment of the invention.

The fourth embodiment of the invention shown in Fig. 8 is identical to that shown in Fig. 1 except for the substitution of a modified control device 71 for the control device 16 of Fig. 1.

The electric current controlling device 71 in Fig. 8 comprises a thermal cycling switch having a first contact 73 that is actuated in response to the temperature of the meat probe 15 relative an adjustable cycling contact 74. These contacts 73 and 74 control energization of the auxiliary heater 17 from transformer 38 in response to the temperature of probe 15, as did the contacts 46 and 47, respectively, of Fig. 1.

The contact 73 is carried by an electrically conducting spring arm 76 and biased thereby toward the left, as seen in Fig. 8, into engagement with an electrically insulating member 77 on an actuator 79, 80 that moves contact 73 in response to changes in temperature of probe 15.

The actuator for contact 73 is a U-shaped structure having sides formed by an indicating bimetal 79 and an ambient temperature compensating bimetal 80. The U-shaped actuator is supported on a stationary pivot 81 and biased counterclockwise by the spring arm 76 with the free end of the compensating bimetal 80 abutting a fixed calibrating screw 82.

The indicating bimetal 79 is in good heat transfer relationship with a heater 84 connected in circuit with the low voltage secondary of transformer 38 and meat probe 15. The heater 84 supplies increasing heat to the indicating bimetal to deflect the latter and the contact 73 to the right, or toward contact 74, as the temperature sensed by the probe increases.

The indicating bimetal 79 has an extension 86 from its deflectible end connected by a linkage 87 to a pointer 88 for indicating the temperature of probe 15. The pointer element 88 is supported on a fixed pivot 89 in the control device with the pointer element registering on a calibrated temperature scale.

When the contact 73 is deflected sufficiently by bimetal 79 to engage contact 74, a circuit is completed to energize heater 17. The control is designed, however, so that the contacts 73 and 74 intermittently open and close with a percentage of on time dependent on both the adjusted position of contact 74 and the position of contact 73 which is determined by the temperature of probe 15.

The adjustable cycling contact 74 is carried by a U-shaped actuator having sides formed by a cycling bimetal 91 and an ambient temperature compensating bimetal 92. The actuator 91, 92 is supported on a fixed pivot 93 and is adjustably positioned relative the pivot 93 by an extension 94 on bimetal 92 engaging a cam 95. The extension 94 is at all times spring biased into engagement with the cam 95, the latter being manually adjustable by moving the indicating arm 96 relative to the temperature scale of the control device 71 to adjust the gap between contacts 73 and 74 and accordingly select the degree of doneness to be reached by a roast being cooked in the oven.

The bimetal 91 is in good heat transfer relationship with a heater 97 connected in series with the contacts 73 and 74 and heater 17 across the secondary of transformer 38. When contacts 73 and 74 engage, heater 97 is energized, causing bimetal 91 to deflect in contact separating direction. Upon separation of contacts 73 nd 74 by bimetal 91, the latter cools and the contacts re-engage. This opening and closing operation of contacts 73 and 74 continues cyclically and controls the amount of heat supplied by heater 17 to the oven thermostat bulb 13.

The cam 95 is pivoted at 89 coaxially of the pointer element 88 and may be provided with any suitable means for manual adjustment thereof. For ease of illustration, the indicating arm 96 is shown with a manually adjustable handle extension above the temperature indicating scale. The control 71 may be mounted in any suitable housing (not shown) which may be positioned remote from the oven in any convenient location such as at the backsplash of a domestic electric range. The ambient temperature compensating bimetals 80 and 92 will prevent changes in ambient temperature adjacent the control 71 from effecting the operation of bimetals 79 and 91, thus enabling the latter to respond more accurately to the heating effects of heaters 84 and 97, respectively.

Since the operation of the control of Fig. 8 is generally the same as the operation of the control of Fig. 1, only the distinctions between the operation of these controls need be noted. Both systems comprise a complete control loop that automatically stabilizes when the meat reaches a selected doneness condition, after which the meat is kept warm without any substantial change in the condition of doneness and without requiring personal attention of the user to the control.

Figure 9:
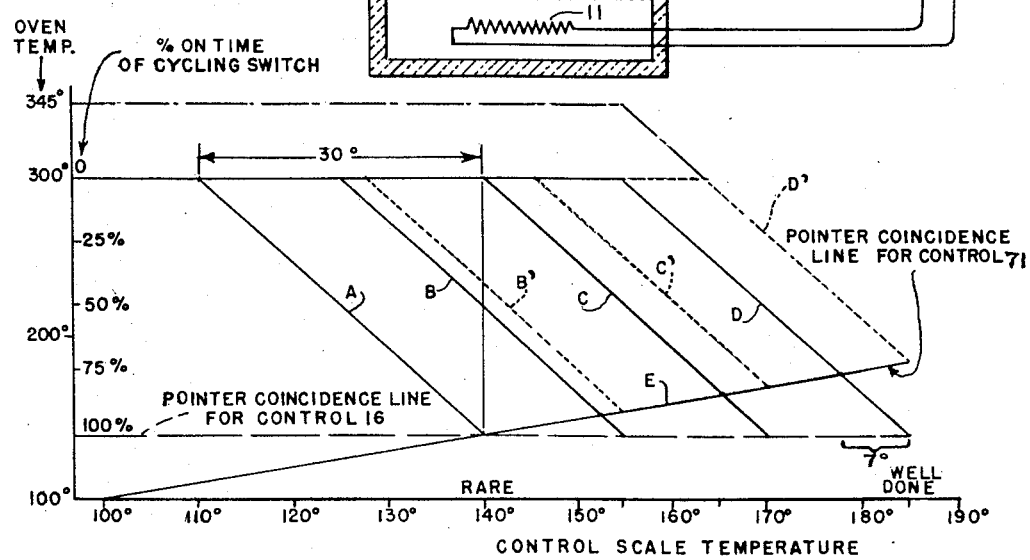
Fig. 9 illustrates graphically certain operating characteristics of the controls of Figs. 1 and 8.

Referring to Fig. 9, various characteristics of the controls of Figs. 1 and 8 are illustrated. Before describing the operation of the controls in connection with the data of Fig. 9, certain general information concerning the lines shown therein must be understood.

The inclined line E represents the locus of equilibrium temperatures attained at doneness for various roasting operations. The equilibrium temperature is the temperature value at which both the oven and the meat probe stabilize at the end of a roasting operation, the oven temperature dropping to this value and the probe temperature riisng to this value. The ultimate equilibrium temperature is determined by adjustment of either pointer 44 in the control of Fig. 1, or arm 96 in the control of Fig. 8. This adjustment, as pointed out previously, selects the final doneness condition of the meat in the range from rare to well done.

Although the operation of the control of Fig. 1 is described earlier in this specification with the use of an initial oven temperature of 350° F., this control may be designed to operate with other suitable initial oven temperatures, such as the 300° F. temperature alluded to in the following comparison of the controls of Figs. 1 and 8. At some meat probe temperature below the final doneness temperature, the oven temperature starts to drop as the cycling switch in the control closes and gradually increases its percentage of on time, thus supplying more heat from heater 17 to the bulb 13 of the oven thermostat. The probe temperature at which the oven temperature starts to drop is also determined by the selection of the doneness condition.

As indicated by the line A, representing a rare roasting operation, in Fig. 9, the control of Fig. 1 may cause the oven temperature to start to drop when the meat probe 15 reaches a temperature of 110° F., which is 30° below the final doneness temperature of 140° F. for a rare roasting operation. This final doneness temperature is represented by the intersection of the line A with the equilibrium temperature line E. The line A also indicates that the control operates in such a manner that the percentage of closed time of the cycling contacts increases from zero percent to 100 percent as the meat probe rises in temperature from 110° F. to 140° F. It is, of course, this rise in meat probe temperature that effects a lowering of the oven temperature by supplying more heat to the bulb 13 of the oven thermostat through heater 17 as the percentage of on time of the cycling contacts increases.

For easier comparison, the data in Fig. 9 has been selected so that the line A may represent a rare roasting operation for either the control of Fig. 1 or the control of Fig. 8. The reason that the same line A may be used for both controls is that the cycling switch of each may be made to change from zero percent to 100 percent on time as the probe 15 rises from 110° F. to 140° F. for a rare roasting operation. Thus, the dashed line at 100 percent, representing pointer coincidence for the control of Fig. 1, intersects the line E at the same point as the intersection of line E with line A. Line E, in addition to indicating equilibrium temperature at doneness, also shows the percentage of on time of cycling contacts 73 and 74 for various positions of coincidence of indicators 88 and 96 on the scale of control 71.

Since the percentage of on time of the cycling contacts 46 and 47 of the control of Fig. 1 is dependent entirely upon the relative positions of the pointers 31 and 44, there is only one percentage of closed contact time of these contacts that can occur when both pointers are aligned at any temperature setting. In Fig. 9, we have assumed this percentage of on time at pointer coincidence for the control of Fig. 1 to be 100 percent, represented by the horizontal dashed line. However, since the cam 95 in control 71 of Fig. 8 may be formed with any desired configuration, it is possible to adjust the cycling contact 74 non-linearly with respect to the adjustment of the arm 96. This enables the cam 95 to be designed so that as the point of coincidence of pointer 88 and arm 96 is moved progressively from the rare to the well done ends of the doneness selecting temperature scale on the control 71, the percentage of on time of the cycling switch 73, 74 at pointer coincidence may be gradually reduced along the line E from 100 percent at the rare or 140° F. setting to approximately 65 percent at the 185° F. or well done setting. The importance of this non-linear cam surface 95 will be apparent upon comparing the lines B, C and D for control 16 and lines B', C' and D' for control 71 for different roasting operations.

The lines B, C and D represent respectively operations of the control 16 of Fig. 1 for settings of pointer 44 at 155° F., 170° F. and 185° F., respectively. These temperatures, incidentally, are represented in Fig. 9 by the points at which the lines B, C and D, when extended, intersect the horizontal dashed pointed coincidence line.

The characteristics of the control of Fig. 1 are such that, as the cycling of the contacts 46 and 47 increases along any of the lines B, C and D, a limit to the increase in percentage of on time is reached when these lines intersect the line E which is the locus of equilibrium oven and probe temperatures. For doneness selections other than rare, this limit will be somewhat below 100 percent where the lines B, C and D intersect the line E and the final meat probe temperature will be slightly below the doneness temperature selected by the pointer 44. This is illustrated, for example, by the 7° differential between the point at which lines D and E intersect and the well done temperature setting of 185° F. of the pointer 44 which conditioned the control 16 to follow line D.

This differential between the intersection of the lines B, C and D and the selected settings of pointer 44 results in slight pointer misalignment when the condition of doneness is reached, assuming that each roasting operation is started at the same oven temperature. Uniform roasting temperatures are usually desirable, but the problem of pointer misalignment might also be overcome by changing the initial oven temperature setting for each type of roasting operation. For example, for a well done roast the initial oven temperature might be raised to 345° F., as indicated by the dot and dash line in Fig. 9 and, with the pointer 44 set at 185° F., the dot and dash curve will drop from the 345° F. level and intersects the line E at 185° F. Thus, both the pointer 31 and the pointer 44 may coincide at the well done end of the selecting range.

The control of Fig. 8 overcomes this pointer misalignment problem by providing non-linearity between the movement of the contact 74 in response to adjustment of arm 96. Thus, by providing the proper slope on cam 95, the pointer coincidence line for the control 71 of Fig. 8 is made to coincide with the equilibrium line E shown in Fig. 9. The lines B', C' and D' represent operation of the control 71 of Fig. 8 for settings of the selector arm 96 of 155° F., 170° F. and 185° F., respectively. For the purpose of comparison, these are the same temperature settings which condition the control 16 of Fig. 1 for operation along the lines B, C and D, respectively.

It will be noted that the meat probe temperatures at which the contacts 73 and 74 initially close to cause the oven temperature to start to drop from the 300° F. level are slightly higher for the lines B', C' and D', but this enables each of these lines to intersect the line E at the same temperature at which the arm 96 is set. Therefore, for any selected roasting operation from rare to well done, the pointer 88 will be exactly aligned with pointer 96 when the selected doneness is reached.

While the invention has been shown in several forms, it will be obvious to those skilled in the art that it is not so limited, but is susceptible of various other changes and modifications without departing from the spirit thereof.

What is claimed is:

1. A thermally responsive control comprising a switch having a pair of contacts, a probe including temperature sensing means, means for supporting and actuating one of said contacts relative the other contact in response to changes in temperature sensed by the temperature sensing means of said probe, adjustable means supporting said other contact, one of said supporting means including an electrically heated, thermally responsive member for cyclically opening and closing said switch in response to the temperature sensed by the temperature sensing means of the probe attaining the value selected by adjustment of said adjustable means, said member being electrically heated under control of said switch, and electrical heating means controlled by said switch, said switch being operable to increase the heat output of said heating means in response to increase in the temperature sensed by the temperature sensing means of said probe.

2. A thermally responsive control comprising a switch having a pair of contacts, a lever rotatable about an axis and supporting a first of said contacts, a thermally responsive actuator for moving said lever and said first contact about said axis, heating means for said actuator, a temperature sensing element, means for varying the energization of said heating means in response to changes in temperature of said element, lever means for positioning the second of said contacts for engagement with said first contact, said lever means being pivotally supported coaxially of said first lever, an electrically heated thermally responsive means for moving one of said contacts out of and into engagement with the other contact, the electrical heating of said thermally responsive means being controlled by said switch, and means for manually adjusting said lever means relative said first lever.

3. An auxiliary control device for use with an oven having heating means and an oven thermostat for regulating said heating means in response to oven temperature, said control device comprising a probe having a thermally responsive element for sensing the internal temperature of a body, such as a roast, within said oven, a cycling switch, means controlled by said element for actuating said cycling switch to vary the percentage of closed contact time of said switch during its cycling operation in response to changes in temperature of said element, an electrical heater for supplying heat to said oven thermostat to modify the regulation of said heating means in response to changes in temperature sensed by said oven thermostat, and means for energizing said heater under control of said cycling switch to increase its heat output in response to an increase in the temperature of said element.

4. In combination with a roasting oven having electrical heating means, a thermostat responsive to the temperature within said oven for controlling the energization of said heating means to regulate the oven temperature, a probe including means for sensing the internal temperature of a meat roast or the like in said oven, a control device remote from said probe and including a cycling switch, means in said device regulated by the temperature sensing means of said probe for actuating said cycling switch, an auxiliary electrical heater for said oven thermostat, said cycling switch being connected to control the energization of said heater and to increase the heat output thereof in response to an increase in the temperature sensed by the temperature sensing means of said probe, the oven temperature regulated by said thermostat being reduced as the heat output from said auxiliary heater is increased under control of the temperature sensing means of the probe, and manually adjustable means for said control device to vary the relationship between the temperature sensed by the temperature sensing means of the probe and the percentage of time that the cycling switch is closed during its cycling operation.

5. A control for regulating the heat output of an electric heater, said control including an electric current controlling device comprising a pair of relatively movable members for varying the average energy supplied to said heater, a temperature responsive instrument including a temperature sensing element and means responsive to the temperature of said element for actuating a first one of said members relative the other, said instrument including an indicator for visually indicating the temperature of said element, manually adjustable means for adjusting said other member relative said first member, said manually adjustable means including an indicator for visually indicating the adjusted condition of said other member, said members being relatively movable to increase the energization of said heater in response to increasing temperature of said element in a predetermined temperature range selected by adjustment of said manually adjustable means, each of said visual indicators being movable upon an indicating scale, said relatively movable members predetermining the average heat output of said heater when said visual indicators coincide at one end of said scale, and means actuated with one of said visual indicators to progressively change the degree of energization of said heater for each position of coincidence of said indicators progressing across said scale.

6. A control device for regulating the heat output of an electric heater, said control comprising a thermal cycling switch for varying the average energy supplied to said heater, a temperature responsive instrument including a temperature sensing element and means responsive to the temperature of said element for adjusting the percentage of closed time of said switch, said instrument including an indicator for usually indicating the temperature of said element, manually adjustable means for adjusting the duty cycle of said switch, said manually adjustable means including an indicator for visually indicating an adjusted condition of said switch, said switch controlling said heater to increase its heat output in response to an increase in temperature of said element, each of said visual indicators being movable upon an indicating scale, said switch determining the heat output from said heater when said visual indicators coincide at one point on said scale, one of said adjusting means acting upon said switch to provide different heat outputs from said heater at different positions of coincidence of said indicators on said scale.

7. An auxiliary control for use with an oven having a heating means and an oven thermostat for regulating said heating means in response to oven temperature, said control comprising a temperature measuring instrument including a temperature sensing element for sensing the temperature of a body, such as a roast, within said oven, a temperature indicating element actuated by said instrument for visually indicating on an indicating scale the temperature of said temperature sensing element, an electrical heater for supplying heat to said oven thermostat to modify the regulation of said heating means in response to the changes in oven temperature sensed by said oven thermostat, said control including a current controlling device comprising a pair of members that are relatively movable to vary the power supplied to the electrical heater, a manually adjustable means for adjusting one of said members, the other of said members being actuated by said instrument in response to changes in temperature of said temperature sensing element, said manually adjustable means having a visual indicating element movable upon the same scale as the visual indicator of said instrument, said relatively movable members effecting gradually increased heat output from the electrical heater as said temperature sensing element increases in temperature up to the temperature value at which said visual indicators coincide on the scale, and means actuated in response to the advancement of one of said visual indicators on said scale to gradually decrease the maximum heat output attainable from said electrical heater at indicator coincidence as the point of indicator coincidence on the scale is advanced.

8. In combination with a cooking oven having heating means and adapted for roasting meat, means for establishing a temperature in said oven suitable for roasting meat, a probe insertable into a body such as a meat roast to be roasted in said oven and including means for sensing an internal temperature of the body, and means including the temperature sensing means of said probe for controlling said heating means to reduce the oven temperature through a series of progressively lower temperatures in response to the temperature sensing means of the probe sensing a series of progressively higher internal temperatures of the body, said oven temperature reducing means continuing to control said heating means at said progressively lower temperatures.

9. For use with a cooking oven having heating means and adapted for roasting meat, a control for said heating means including: an oven thermostat having an effective control temperature and operating to control said heating means to maintain the temperature in said oven at a value suitable for roasting meat, a probe insertable into a body such as a meat roast to be heated in said oven and including means for sensing an internal temperature of said body, and means including the temperature sensing means of said probe for reducing the effective control temperature of the oven thermostat through a series of progressively lower temperatures in response to the temperature sensing means of the probe sensing a series of progressively higher internal temperatures of the body, said oven thermostat, under control of said oven control temperature reducing means, continuing to control said heating means at said progressively lower temperatures.

10. For use with a cooking oven having heating means and adapted for roasting meat, a control for said heating means including: an oven thermostat for controlling the heat output of said heating means to maintain the temperature of said oven at a value suitable for roasting meat and including an element responsive to heat from said oven, a probe insertable into a body such as a meat roast to be cooked in said oven and including means for sensing an internal temperature of said body, auxiliary means affecting the temperature of the oven heat responsive element, and means responsive to the temperature sensing means of said probe for activating said auxiliary means to affect the temperature of the oven heat responsive element and reduce the temperature setting of said oven thermostat through a series of progressively lower temperatures in response to the temperature sensing means of the probe sensing a series of progressively higher internal temperatures of the body.

11. In combination with a cooking oven having heating means therefor and adapted for roasting meat, a control for said heating means comprising an oven thermostat having a selected control temperature and controlling said heating means to maintain the oven temperature substantially at said selected control temperature, said control further including a probe insertable into a body such as a meat roast to be heated in said oven and including means for sensing an internal temperature of said body, and means for modifying the action of said oven thermostat by causing it to control the heating means throughout a series of progressively lower temperatures in response to the temperature sensing means of said probe sensing a series of progressively higher internal temperatures of the body.

12. In combination with a roasting oven having electrical heating means, a control for said heating means including an oven thermostat having a temperature sensing element within the oven, said thermostat being adjustable to regulate the temperature within the oven, an auxiliary heater adjacent the sensing element of the oven thermostat, a probe including means for sensing the internal temperature of a meat roast or other comestible in the oven, a thermal cycling switch controlled in response to the temperature sensed by the temperature sensing means of said probe and connected to regulate the energization of the auxiliary heater, the probe temperature sensing means controlling the operation of the cycling switch to increase the percentage of closed time during its cycling operation in response to an increase in probe temperature sensing means temperature, the heat output of the auxiliary heater being increased with an increase in the percentage of closed time of the cycling switch to reduce the temperature setting of said oven thermostat.

13. A thermally responsive control comprising a switch having a pair of contacts, a first member supporting a first of said contacts, a thermally responsive actuator for moving said member and said first contact, heating means for said actuator, a temperature sensing element, means for varying the energization of said heating means in response to change in temperature of said element, a second member for positioning the second of said contacts for engagement with said first contact, a heat responsive means for moving said second contact out of and into engagement with said first contact, the heating of said heat responsive means being controlled by said switch, and means for manually adjusting said second member relative to said first member.

14. A thermally responsive control comprising a switch having a pair of contacts, a lever rotatable about an axis and supporting a first of said contacts, a thermally responsive actuator for moving said lever and said first contact about said axis, heating means for said actuator, said actuator when heated moving said first contact to a position corresponding to the degree of heating of said actuator, lever means for positioning the second of said contacts for engagement with said first contact, said lever means being pivotally supported coaxially of said first lever, an electrically heated thermally responsive means for moving one of said contacts out of and into engagement with the other contact, the electrical heating of said thermally responsive means being controlled by said switch, and means for manually adjusting said lever means relative said first lever.

15. A thermally responsive control comprising a switch having a pair of contacts, a lever rotatable about an axis and supporting a first of said contacts, a thermally responsive actuator for moving said lever and said first contact about said axis, heating means for said actuator, said actuator when heated moving said first contact to a position corresponding to the degree of heating of said actuator, lever means for positioning the second of said contacts for engagement with said first contact, said lever means being pivotally supported coaxially of said first lever, an electrically heated thermally responsive means for moving one of said contacts out of and into engagement with the other contact upon heating and cooling, respectively, of the thermally responsive means, the electrical heating of said thermally responsive means being controlled by said switch, and means for manually adjusting said lever means relative said first lever.

References Cited in the file of this patent

UNITED STATES PATENTS

| | | |
|---|---|---|
| 2,056,941 | Krichton | Oct. 13, 1936 |
| 2,273,734 | Pearce | Feb. 17, 1942 |
| 2,499,906 | Crise | Mar. 7, 1950 |
| 2,510,526 | Smith | June 6, 1950 |
| 2,611,850 | Walton | Sept. 23, 1952 |
| 2,727,973 | Collins | Dec. 20, 1955 |
| 2,780,709 | Thompson et al. | Feb. 5, 1957 |
| 2,819,371 | Aldrich et al. | Jan. 7, 1958 |
| 2,820,130 | Dadson | Jan. 14, 1958 |
| 2,883,507 | Lewis et al. | Apr. 21, 1959 |